May 31, 1966 HIRAKI TAKEHARA 3,253,375
ASSEMBLING PLATES FOR BUILDING
Filed June 29, 1960 5 Sheets-Sheet 2
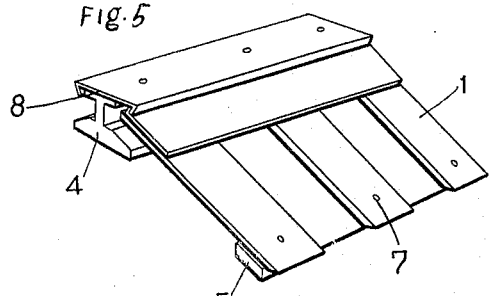
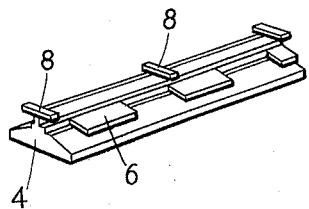
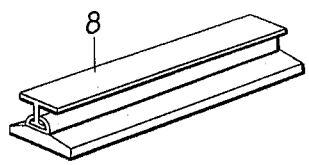
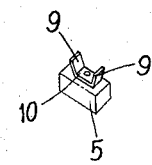
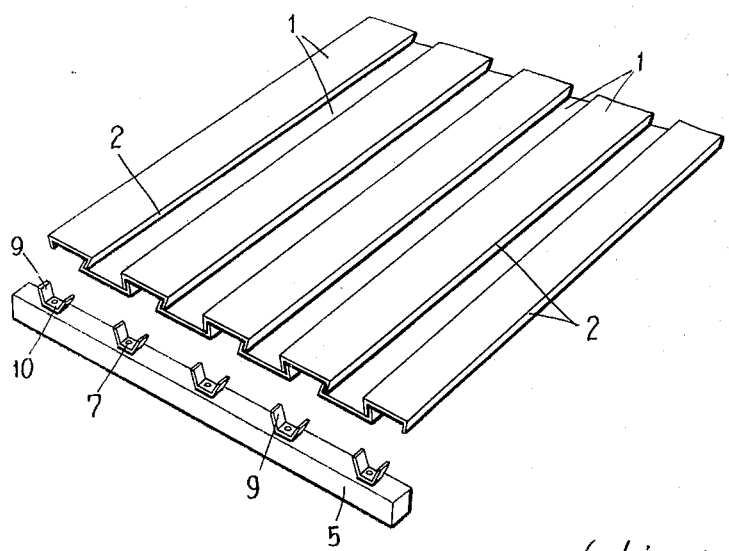

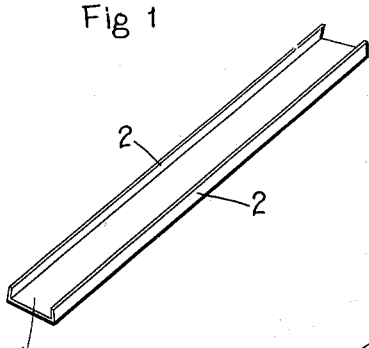
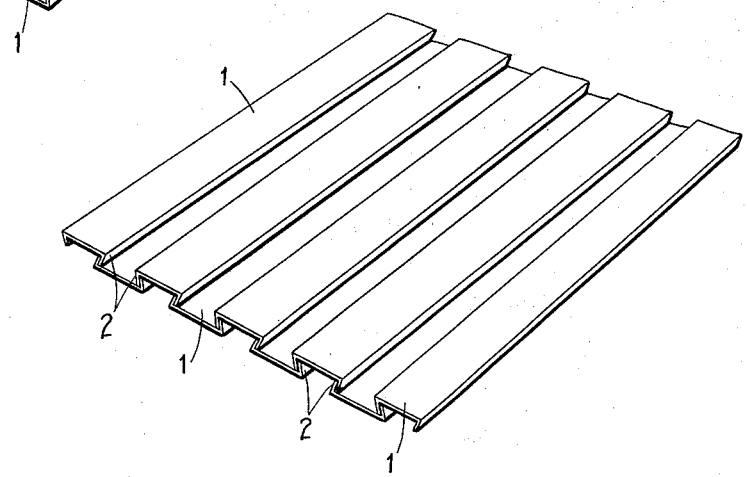
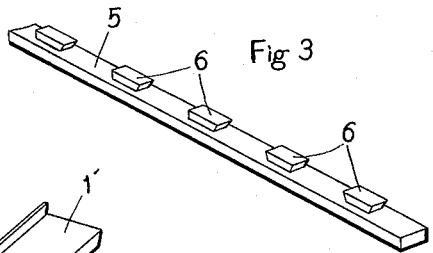
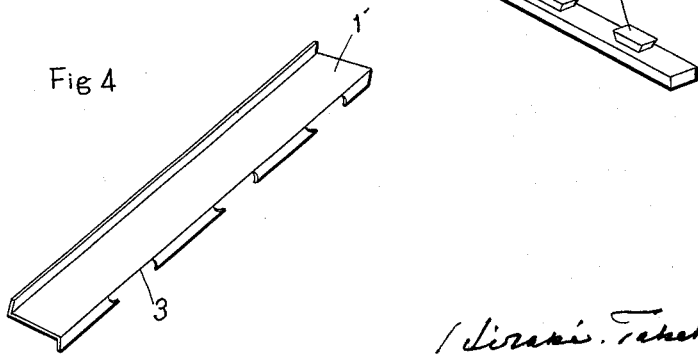

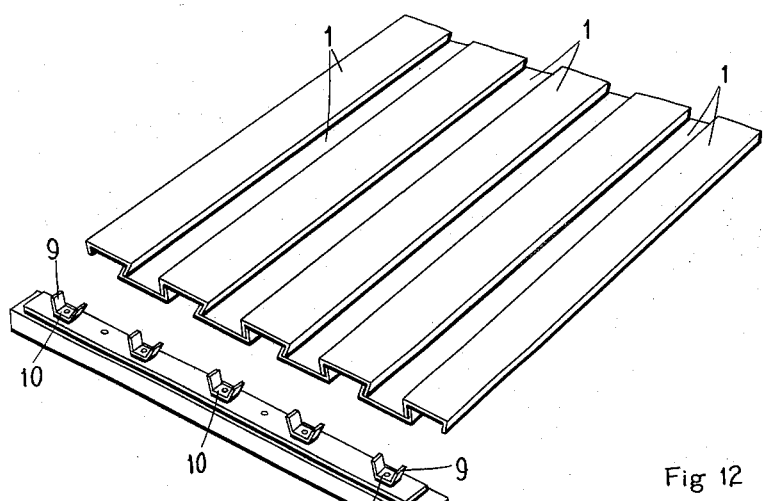
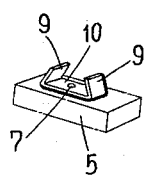
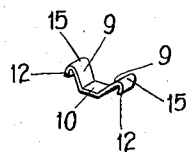
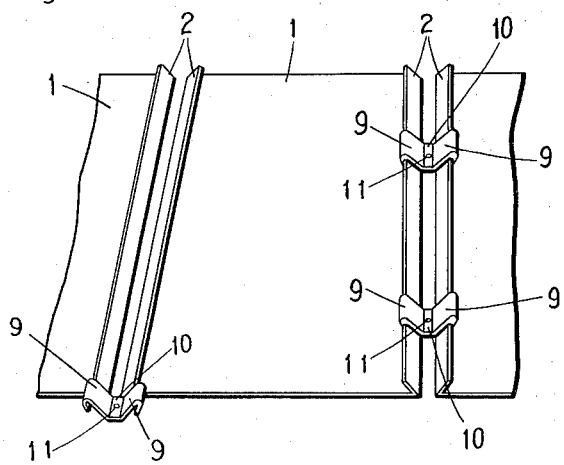
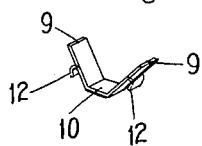

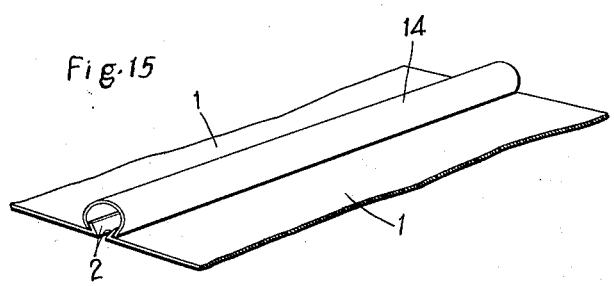
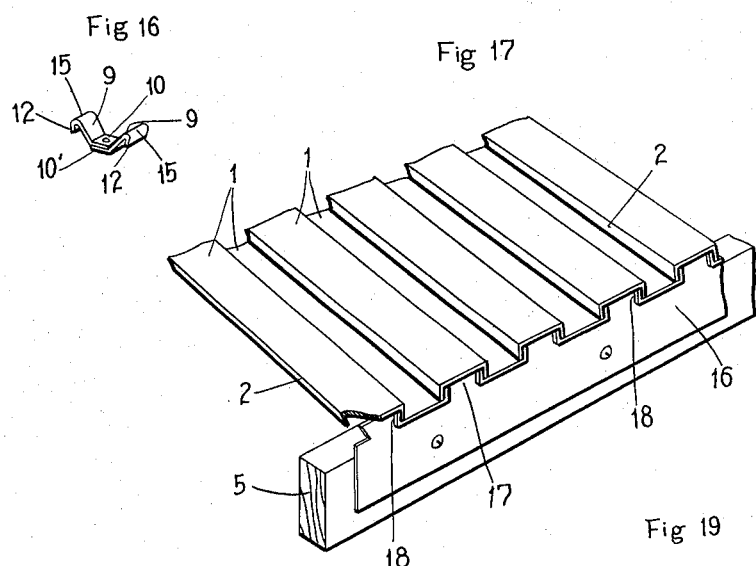
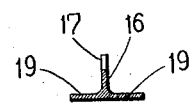
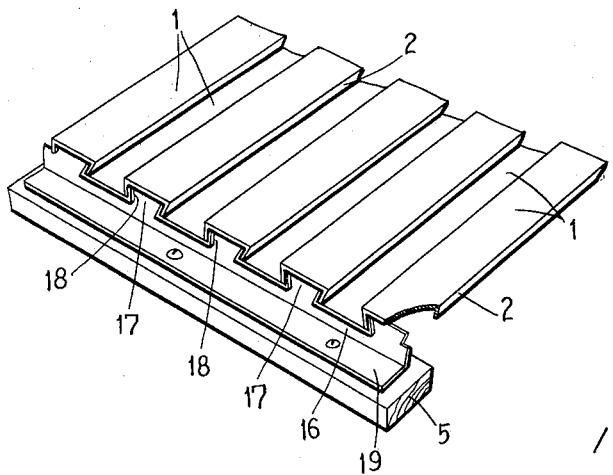

May 31, 1966  HIRAKI TAKEHARA  3,253,375
ASSEMBLING PLATES FOR BUILDING
Filed June 29, 1960  5 Sheets-Sheet 5
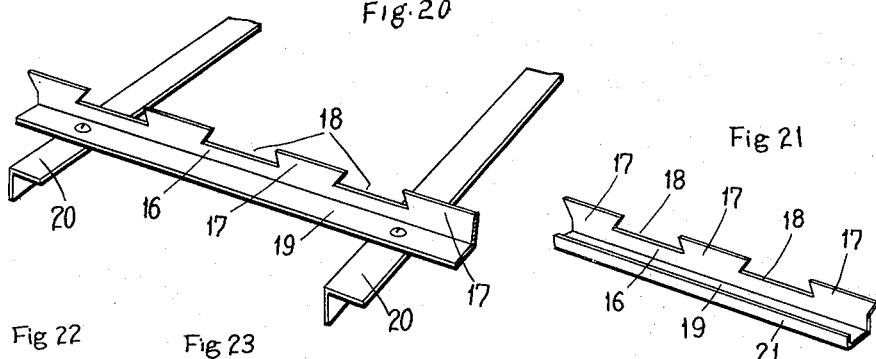
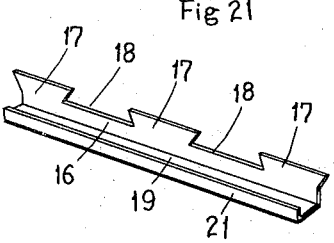
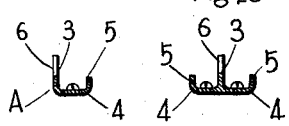
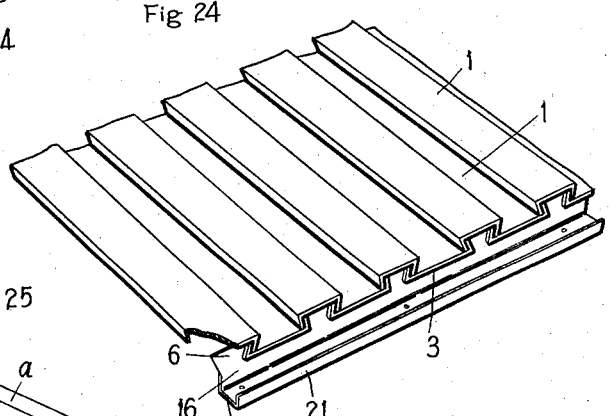
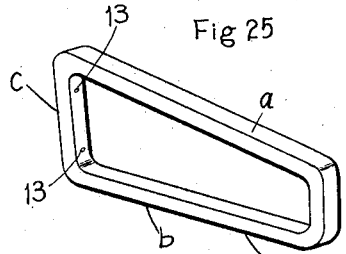
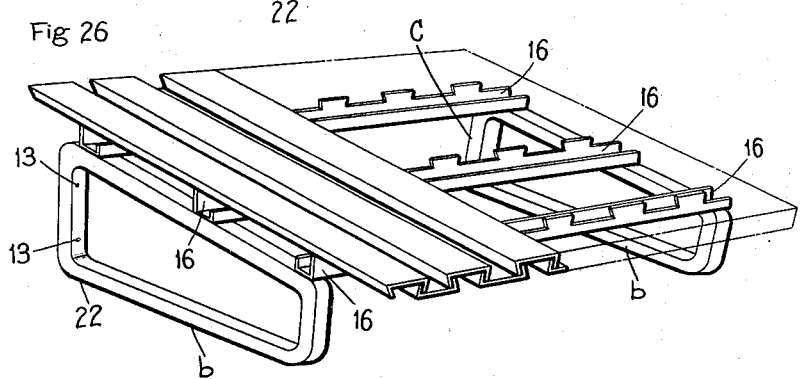
Hiraki Takehara United States Patent Office 3,253,375
Patented May 31, 1966

3,253,375
ASSEMBLING PLATES FOR BUILDING
Hiraki Takehara, 40 Nikawacho 3-chome,
Nishinomiyashi, Japan
Filed June 29, 1960, Ser. No. 39,548
Claims priority, application Japan, July 3, 1959,
34/38,160; July 9, 1959, 34/39,175; Sept. 7, 1959,
34/49,168; Feb. 26, 1960, 35/9,215; Feb. 28, 1960,
35/9,464; Feb. 29, 1960, 35/9,825; Mar. 4, 1960,
35/10,666
1 Claim. (Cl. 52—478)

This invention relates in general to building structures, and in particular to a new and useful built-up roof formation.

The present invention is an advantage over the prior art, particularly in respect to the means for interengaging channel-shaped roof elements on projections formed on lateral supports.

An object of the present invention is to provide an improved roof formation which includes a plurality of interengaged channel-shaped elements which are supported laterally on substantially trapezoidal-shaped projections or wedges which interengage with their ends.

Referring to the drawings which illustrate a preferred embodiment of my invention, FIG. 1 is a perspective view of a unit-plate for construction in accordance with my invention;

FIG. 2 is a perspective view of the unit-plates for construction which are constructed and combined;

FIG. 3 is an oblique side view of the fittings;

FIG. 4 is an oblique side view of a plate which is used to combine the top part of the unit-plates of this invention with the summit part of roof;

FIG. 5 is an oblique side view when the roof is constructed;

FIG. 6 is an oblique side view of the fittings part of the summit as shown in FIG. 5;

FIG. 7 is an oblique side view of another type of summit part, differed from FIG. 6;

FIG. 8 is an oblique side view of a typical clasp;

FIG. 9 is an oblique side view indicative of combination of the fittings with the assembling plates;

FIG. 10 is an oblique side view of the assembling plates and a beam which is combined with belt-shaped bodies fixed by fittings;

FIG. 11 is an oblique side view of the clasp (fittings) whose both ends are bent inward and face each other;

FIG. 12 is an oblique side view of a clasp of plate;

FIG. 13 is a perspective view of assembling plates fixed and combined by the clasp;

FIG. 14 is an oblique side view when the both sides of the clasp are stretched;

FIG. 15 is a perspective view when a pipe-shaped plate is put on the assembling plates;

FIG. 16 is an oblique side view of another type of clasp;

FIG. 17 is a perspective view of assembling plates fixed and combined by a clasp of slats;

FIG. 18 is a perspective view of assembling plates fixed and combined by a sticker of slats;

FIG. 19 is a cross sectional view of the sticker of slats;

FIG. 20 is a perspective view of the sticker of slats fixed on cross-beams;

FIG. 21 is an oblique side view of a holding frame for assembling plates;

FIG. 22 is a cross sectional view of FIG. 21;

FIG. 23 is a cross sectional view when two fittings are arranged in both sides of FIG. 21;

FIG. 24 is a perspective view of assembling plates fixed and combined by the holding frame;

FIG. 25 is an oblique side view of an arm-frame for eaves; and

FIG. 26 is a perspective view of assembling plates fixed on the arm-frames.

This invention provides a building structure using channel-shaped plates for construction which can be interengaged and supported at respective sides. They have a simple structure and may be manufactured easily and are very strong, as indicated in the figures from FIG. 1 to FIG. 8.

In other words, the unit-plate of this invention is characterized by the structure of the unit-plate for construction where both flanks 2, 2 of a rectangular plate 1 are bent into the same direction and their angles of intersection with the central part of the plate 1 are made to be acute.

The basic structure of the unit-plate of this invention enables the construction of a series of plates as shown in FIG. 2, by arranging a plural number of unit-plates 1, 1 . . . in a line with alternate plates inverted and engaged over the sides of the upright plates.

Since the flanks 2, 2 extend at an acute angle $\theta$ from the central part 1, the moment of inertia of the cross section of the unit-plates increases, so that the bending strength is increased. Furthermore as the structure is simple, it may be easily and economically manufactured. A series of constructed unit-plates are used for wall, roof and so forth.

In the case of the application to a roof, a ridge 4 as shown in FIG. 6 and a cross-piece 5 for eaves as shown in FIG. 3 are made to have the fixed projections 6 of upset trapezoid form which are spaced uniformly and inserted between the flanks 2,2.

On the flat parts situated between the fixed projections 6, 6 of the upset trapezoid, the unit-plates with upward directed flanks are inserted.

On the fixed projections 6, the unit-plates with downward directed flanks are inserted and engage over the upwardly directed flanks of the adjacent plates. Proper unit-plates are fixed on the ridge and cross-piece by nails or pegs, and thus an oblique side of roof with less clearance between plates can be constructed.

A unit-plate 1' as shown in FIG. 4, in which the flanks 2, 2 are bent in opposite direction to each other and notches 3, 3 are arranged, is carried on a series of unit-plates as shown in FIG. 2, fixed by pegs 7, 7, and put on the upper side or ridge or lateral support, as indicated in FIG. 5. The flanks 2, 2 of the above-mentioned unit-plate 1 are combined with the notches 3,3 of the unit-plate 1'. The upward directed flank of the above-mentioned unit-plate 1' is combined with the downward and inward bent flank of unit-plate which is fixed to a crown-plate 8 with a T-shaped cross section, which in turn is fixed horizontally in the top part of the roof. By this method, we can obtain a constructed house-top which is completely constructed and tightly fixed.

In this way, the unit-plates for construction are used for several structures making use of the flanks bent acutely, also as material for building.

Instead of using trapezoid pieces to fix the unit-plates for construction of this device, it is possible to fix the unit-plates for construction themselves by use of bent pieces where both flanks 9, 9 in FIG. 5 are bent by an acute angle in the same direction regarding the extended plane of the central plate 10. Also the flnaks 2, 2 may be bent in the same direction and used for the same purpose.

As indicated in the figures from FIG. 9 to FIG. 11, another means for setting the assembling units of the present invention is to use an upset V-shaped clasp or tongue 10 which is made by bending the both ends 9, 9 upwardly at an angle.

As indicated in FIG. 9, a plurality of tongues 10 are fixed on a beam 5 at proper intervals, and thence they are slided and inserted so that the sides 9, 9 engage outside of the bent ends, 2, 2 of the upwardly directed plates.

The clasp may be used by fastening it with a nail or screw 7 on the beam 5 as well as by producing rectangular projections from the belt or base 11 by the method of point-welding or one-body-welding on another belt 11 as shown in FIG. 10.

Another method of setting the assembling units of this invention will be to use a clasp of plate in which plate-bodies 9, 9 are extended in the oblique outer directions from the confronted sides of the rectangular plate 10 respectively and the hook plates 12, 12 are connected to the ends of the plate-bodies 9, 9 as indicated in the figures from FIG. 12 to FIG. 16.

In this version the plate 10 has outwardly bent sides 12, 12 with downturned ends 15, 15 which engage around side walls 2, 2 of channels 1 which are bent beyond 90°.

Another method of fixing by the clasp of this device is as follows. The flat plate-bodies (flanks) 10 are adjoined into the oblique outer sides 2, 2 by modified bent sides 12, 12.

By wearing a bent plate 14 of C-shaped cross section on the outer sides of the confronted sides 2, 2 of the adjoining plate-bodies 1, 1, leakage of rain-water between the plate-bodies 1, 1 is avoided and thus it is possible to prevent rusting of the fixing nails.

The securing of plate 10 may be made of metal as well as synthetic resin.

Another method of setting the assembling units of this invention can be performed using securing elements or tongues 17, 17 of substantially trapezoidal shape which are formed on a side of a lateral support plate 16 at regular intervals. Similarly shaped notches with broadening inner-breadth are arranged between these tongues 17, 17, as indicated in FIG. 17.

In order to use the securing plates 16, the pieces (slats) 1, 1 . . . of C-shaped cross section with the upward directed openings are laterally inserted, being inserted approximately in the notch parts 18, 18 . . . with the innerward spreading width. The slats 1, 1 . . . of C-shaped cross section with the downwardly directed openings are inserted to cover and hold both each tongue 17 with the spreading tip-width and the adjoining side of the slats of C-shaped cross section with the upward directed openings.

In order to construct eaves, for instance, the securing plates 16 are arranged mutually parallel to plural number of beams 5, 5 carried between wedges.

In application of this device, it is not necessary to nail or screw the pieces 1, 1, but the pieces 1, 1 of C-shaped cross section but they are secured by their interengagement as shown in FIG. 17.

As indicated in the figures from FIG. 18 to FIG. 20, another method of setting the assembling units of this invention will be to use a sticker of slats in which (trapezoid) tongues 17, 17 with broadening tip-width are projected from one side of the belt-shaped plate 16 at regular intervals, notch parts 18, 18 with broadening inner-width are arranged between these tongues 17, 17. Slats 1, 1 of C-shaped cross section with upward directed openings are laterally inserted in these notches 18, 18 respectively, slats of C-shaped cross section with downwardly directed openings are laterally inserted in such a way that the flanks 2, 2 of the slats 1, 1 securely hold both the tongues 17 and the flanks 2, 2 of the slats 1, 1. Another belt-shaped plate 19 is fixed and adjoined vertically to the belt-shaped plate 16 (sticker plate) which fixes slats 1, 1 . . . and is situated in the opposite side to that adjoining to the tongues 17, 17.

In order to fix the slats of C-shaped cross section, for instance, slats for roof as shown in FIG. 20, the sticker of slats is fixed not on beams fixed on the cross beams 20, 20 but directly on the cross-beams 10, 10 themselves, and thus fixing on the cross-beams 20, 20 is very easily and securely performed because of existence of the belt-shaped plate 19 fixed nearly vertical to the lower part of the sticker.

In other words, as the lower side of the belt-shaped plate 19 can be faced directly to the upper side of the cross-beam 20 and it is possible to nail the plate, nailing is very easy and tight, enabling the plate to fix securely.

When there is a load on the slats 1, 1 . . . combined with the sticker, the belt-shaped plate part 16 adjoining to the tongues 17, 17 . . . and the notches 18, 18 . . . tends to bend and curve laterally normal to the face of the belt-shaped plate.

Since the lower belt-shaped plate 19 is arranged nearly normal to the pieces (tongues) of the upper belt-shaped plate 16, the strength against the lateral bending increases, so that we can get the sticker of slats not curving nor breaking against heavier weight on the slats.

The strength against curving is increased by the lower belt-shaped plate part 19 as above-mentioned, therefore, we can get strong stickers of slats with the short overall height.

By this reason, the depth from the slats to the lower side of the cross-beam is made very small.

Of course, the sticker may be used by fixing it on the beam 5, as indicated in FIG. 18.

As indicated in figures from FIG. 21 to FIG. 24, another possibility of setting the assembling units of this invention on others is to use a holding frame of slats in which the tongues 17, 17 . . . with the broadening tip-width are projected at regular intervals from one side of the belt-shaped plate 1. The L-shaped piece 19 is fixed laterally to the lower edge of the holding plate 16 which is composed of the tongues 17, 17 . . . and the belt-shaped plate 1, and the free part 21 of the L-shaped piece 19 is positioned in the same side as that of the holding plate 16.

Of course, it is possible to attach the piece 19 of L-shaped cross section laterally to one side of the lower edge of the holding plate 16 as well as to attach and fix the pieces 19, 19 of L-shaped cross sections respectively to the both sides of the lower edge of the holding plate 16.

Furthermore, it will be possible to arrange the above-mentioned fixing plates 19, 19 and reinforcing plates 21, 21 in both sides of the holding plates 16 as indicated in FIG. 23.

In order to use the holding frame, part 19 of L-shaped cross section is put on a proper beam and fixed by nails or screws, pieces (slats) of C-shaped cross section are inserted and carried in the nearly vertical direction between the adjoining tongues 17, 17 of the holding plate respectively, and the slats of C-shaped cross section are inserted circumscribing sides of slats adjacent to sides of tongues 17, 17 . . . .

Virtues of the holding frame are as follows. In the case of holding the slats 1, 1, the lateral insertion into the notch part 18 can prevent the slats from displacement back and forth. The slats 1, 1 can be tightly combined and held each other, and besides each slat is held by the base of the correspond notch 18 as well as by the upper edge of the reinforcing rim 21 when the slats 1, 1 are inserted in the correspond notches 18, 18 between the tongues respectively, and thus the slats can be securely held.

Thence, even by thin plates it is possible to obtain a strong clasp holding the slats as above-mentioned, so that there is a merit that the manufacture is very easy in the case of using metal plates.

Because the fixing plate 19 can be carried on a few beams and nailed from the above, it is very easy to fix it. If only the fixing plate 16 is used, it must be nailed laterally normal to a few beams.

If there is not the piece 19 of L-shaped cross section when the holding plate 16 is carried and fixed normal to a few beams, it is necessary to increase the depth of the belt-shaped plate part 16 in order to increase its strength. In this case, therefore, as the overall height of the holding plate 16 is great beams should not extend to very low position under the lower surface of the slats.

By application of this clasp, however, it is possible to obtain a very strong clasp of slats compared to the depth, because the belt-shaped plate part 16 and the reinforcing piece 21 counterbalances each other in respect to weight.

As indicated in FIG. 25 and FIG. 26, the assembling units of this invention can constitute eaves by use of a setting bar and an arm-frame for eaves which can be easily installed as occasion demands. Characteristic of the device is that the arm-frame is composed of the nearly right triangular frame-body on the whole, and relates to the structure of the arm-frame in which the vertical shorter side $c$ and the hypotenuse $a$ are flattened in their outer sides.

In other words, the arm-frame is composed of framebody 22 of angled, pipe-shaped or plastic member made approximately in the shape of right triangle in which the hypotenuse $a$ acts as a fittings part of the eaves, and the long base $b$ adjoining the hypotenuse $a$ acts as an arm bearings for reinforcement. The remaining vertical side $c$ acts as a fitting part. In these sides $a$, $c$, proper holes 13, 13 for fixing are pierced.

In the case of using the arm-frame of this device, the vertical part $c$ is fixed on a window frame, other post or box, and the hypotenuse part $a$ of the frame body 22 is positioned in the above. On the hypotenuse part, proper eaves-plate is set and fixed, and thus it is possible to arrange the eaves in front of house.

16, 16 in the figure are grooved members whose openings are directed upward and the plates are engaged thereover as indicated in FIG. 16. In the mutually corresponding hollows of a few pieces for fixing, slats of C-shaped cross section are hanged directing the openings upward. On sides of the adjoining slats, slats of C-shaped cross section directing the openings downward are combined and inserted, and thus an eaves-roof will be constructed.

What I claim is:

A built-up roof comprising, in combination, a plurality of substantially identical relatively elongated channel members each including a base and a side flange extending along each respective side of said base and each disposed in a single plane, said flanges being bent toward each other at equal acute angles to said base; said channels being juxtaposed and facing alternately in opposite directions with each channel member having its flanges interlocked with the flange of a channel member of each side thereof, the interlocked flanges being superposed with surface-to-surface bearing contact over substantially their entire facing areas; and a relatively elongated unitary support member extending transversely of said juxtaposed channel members, said support member having a channel cross section including a base and first and second flanges extending along respective opposite edges of said base and substantially normal thereto; said first flange extending substantially beyond said second flange and the outer edge of said first flange being formed with a series of alternating inverted trapezoid tongues and trapezoid notches, with the notches conformingly embracing the upwardly facing channel members and having their base edges spaced from the base of said support member a distance equal to the height of said second flange, and the tongues conformingly engaging the bases of the downwardly facing channel members and the flanges of the upwardly facing channel members and conformingly engaging the side flanges of the upwardly facing channel members to lock the side flanges against the side flanges of the downwardly facing channel members, the bases of the upwardly facing channel members having supporting engagement along their complete widths between side flanges on the upper substantially rectilinear edge of said second flange.

References Cited by the Examiner

UNITED STATES PATENTS

| 2,051,064 | 8/1936 | Worden | 52—416 |
|---|---|---|---|
| 2,616,283 | 11/1952 | Branstrator | 52—408 |
| 2,748,727 | 6/1956 | Plummer | 52—489 |
| 2,842,237 | 7/1958 | Paulssen | 52—537 |
| 2,897,620 | 8/1959 | Fitzgerald | 52—311 |

FOREIGN PATENTS

| 496,612 | 7/1950 | Belgium. |
|---|---|---|
| 1,127,528 | 8/1956 | France. |
| 1,145,869 | 5/1957 | France. |

FRANK L. ABBOTT, *Primary Examiner.*

WILLIAM I. MUSHAKE, *Examiner.*

JACOB L. NACKENOFF, EARL J. WITMER, CHARLES E. O'CONNELL, D. W. GRAVES, J. SHAPIRO, *Assistant Examiners.*